United States Patent
Malik et al.

Patent Number: 5,987,110
Date of Patent: Nov. 16, 1999

[54] METHOD AND SYSTEM TO BYPASS ALTERNATE ROUTING PLANS APPLIED TO DIRECTORY NUMBERS

[75] Inventors: Dale Malik, Dunwoody; Robert Koch, Norcross, both of Ga.

[73] Assignee: BellSouth Intellectual Property Corporation, Wilmington, Del.

[21] Appl. No.: 08/511,743

[22] Filed: Aug. 7, 1995

[51] Int. Cl.[6] .............................. H04M 3/00; H04M 1/64; H04M 3/42; H04M 7/00

[52] U.S. Cl. .......................... 379/196; 379/88; 379/210; 379/211; 379/214; 379/221; 379/230

[58] Field of Search ..................................... 379/188, 196, 379/197, 198, 207, 210, 211, 212, 214, 219, 220, 229, 230, 67, 88, 89, 221

[56] References Cited

U.S. PATENT DOCUMENTS

| | | | |
|---|---|---|---|
| 5,329,578 | 7/1994 | Brennan et al. | 379/211 X |
| 5,467,388 | 11/1995 | Redd, Jr. et al. | 379/221 X |

OTHER PUBLICATIONS

CrisisLink Service Question & Answer Booklet, "Protecting Your Connection to the World When you Need it Most", BellSouth Business Systems, pp. 1–9, no date.

*Primary Examiner*—Harry S. Hong
*Attorney, Agent, or Firm*—Jones & Askew, LLP

[57] ABSTRACT

In an intelligent switched telephone network wherein a redirection service is operative with respect to communications directed to a directory number to direct communications away from the directory number to at least one other directory number, a method and system for bypassing the redirection service and routing a communication to the directory number. A communication received in the network and directed to the directory number has its identification information read and compared to entries in a database of subscriber information for a matching entry. The matching entry is read for a bypass feature, which indicates that the source of the communication is to be given an option of bypassing the redirection service and of having the communication routed to the directory number. In response to finding the bypass feature, the source is accorded an opportunity to enter a password. The entry of the password indicates a desire by the source to take advantage of the bypass option. In response to the entry of the password, the password's validity is checked against the database of subscriber information. If the password is valid, the communication is routed to the directory number so that the communication effectively bypasses the redirection service.

18 Claims, 4 Drawing Sheets

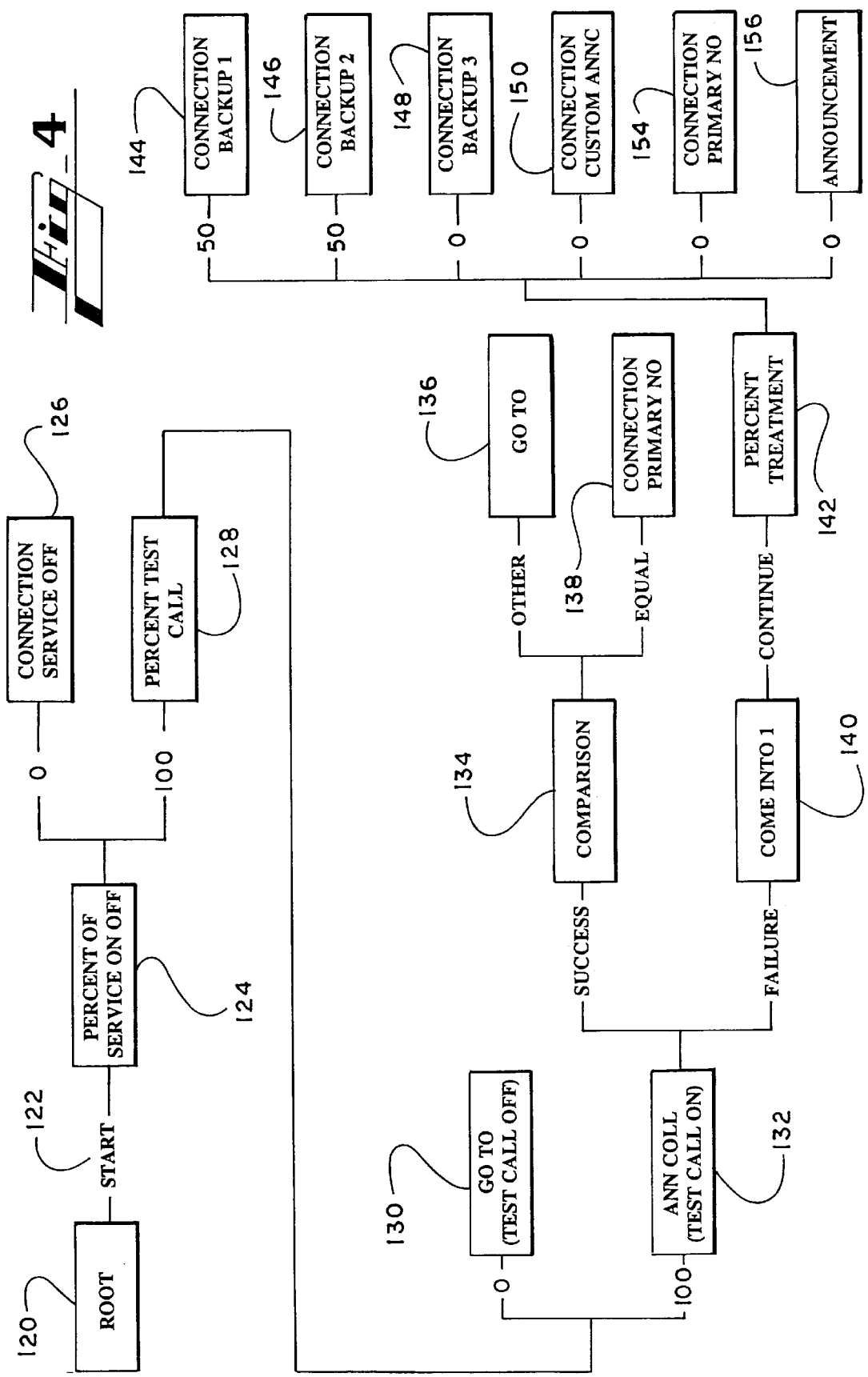

METHOD AND SYSTEM TO BYPASS ALTERNATE ROUTING PLANS APPLIED TO DIRECTORY NUMBERS

TECHNICAL FIELD

The present invention generally relates to telecommunications systems, and more particularly, relates to a method and system for routing a communication to a dialed directory number through a bypass of the redirection service applied to the directory number for the purpose of checking or testing the telecommunications service applied to the directory number.

BACKGROUND OF THE INVENTION

In bygone days, rudimentary means of communication limited people (and often only monied people) to exchange only rare, short, and therefore, usually only very important messages. As a result of the innovations in communication, the days of the carrier pigeon and the pony express are gone. Gone, too, are the days of the exchange of only rare, short messages. Yet, the importance of message exchange has not diminished, but has grown. Our businesses, society and culture have come to place a very high reliance on communication services. The extensive promulgation and use of wireless telephones, facsimile machines and worldwide networking of computers are just recent examples of the continuing growth of communication services, and our increasing dependence on such services.

To state the obvious, today's business relies heavily on communication services. In the referenced bygone days, the mom-and-pop grocery store on the corner primarily served neighborhood residents. Today, the mom-and-pop grocery store (if it still exists) keeps in touch with its suppliers through the use of cellular telephones and pagers, receives customer orders by fax, and has a web site on the Internet to boost its business. Any disruption to its communication services has a serious, negative impact on the business of the mom-and-pop grocery store. In fact, many businesses, such as financial institutions and stock and bond brokers, would simply be out-of-business if there were any disruptions to their communication services. Similarly, our educational, health and social institutions would suffer in many ways as a result of any disruption to their communication services. Further, the inability to quickly get in touch with a family member or friend in case of emergency or for any other reason is simply unacceptable to many people.

Disruptions to communication services are relatively rare, but they do occur on all scales. As noted, when such disruptions occur, they have a serious negative impact on the businesses and other institutions that rely on such services. Examples of grand scale communication disruptions include natural disasters such as hurricanes, tornadoes, floods, blizzards, ice storms, earthquakes and forest fires, and include man-made disasters such as wars, police actions, riots, and civil unrest. Examples of smaller scale disasters include localized power outages, brown outs, and other such events. Of course, communication services to a particular home, business, church or school may be disrupted by an event such as a fire, power outage, gas leak, or flooding that has plagued that particular location. Everybody within the disaster area (whether it be on a grand or small scale) will suffer some communication service disruption as a result of the disaster. Particularly hardhit by a disruption to communication services will be the aforementioned financial institutions such as banks and stock brokers that literally rely on the exchange of information as their business. Also hardhit by a communication disruption will be sales and service organizations that rely on the telephone, fax machine or networked computer for sales and service calls. In particular, a business that relies on calls to an "800" or "900" number will especially suffer. Further, during a communication service disruption, service organizations such as local police, fire and medical facilities ("911 services") and emergency relief organizations such as the American Red Cross will be hampered and the people they serve will suffer delays and the consequences of such delays.

In addition, human nature and human foibles being what they are, communication services may be disrupted as a result of actions or the lack of actions on the part of the resources that interact with the communication services. Let's take the example of the mom-and-pop grocery store again, but modify it to expand the example to a mom-and-pop grocery store chain with each store in the chain taking delivery orders over the telephone. If the communication services to the grocery stores are set up such that each store has its own directory number for delivery orders, then each store must staff the telephone in the store associated with the directory number. If one of the stores has a problem with staffing the telephone, then the communication service to that store is effectively disrupted. Staffing problems are myriad and include staff scheduling problems, vacation or holiday periods, staff absence because of illness or injury, and employment walk-outs or strikes. Generally stated, such staffing problems fall within the purview of resource management and load balancing with respect to the communication duties that must be performed to maintain the operations of the business, social or educational institution.

To insure that the proverbial and literal lines of communication remain open, many businesses and other social and educational institutions subscribe to communication redirection services. There are several different types of communication redirection services. The simplest of these services is commonly known as "call forwarding". To explain call forwarding, we use a household example. A family may have one telephone number that is assigned to the telephone line(s) that connect the telephones in the family home to the public switched telephone network (PSTN). This telephone number is conventionally referred to as a "directory number". If the family subscribes to call forwarding service for that directory number, the family may specify that all calls directed to that directory number (i.e., calls that are "dialed" to the directory number as the called party number) during a particular period of time be "forwarded" to a different directory number. As those of ordinary skill in the art are aware, these forwarded calls are not actually transferred from the family's telephone to the telephone associated with the different directory number. Rather, the central office of the PSTN serving the family's telephone will have received the call, noted that all calls directed to the family's directory number are to be sent elsewhere, and redirected all such calls to the telephone associated with the different directory number. Thus, a family going on vacation to the beach, may forward for the period of the vacation all the calls directed to the family's directory number to the telephone number of the beachhouse where the family is staying. In this way, the family insures that its communication service is not disrupted by the vacation.

Call forwarding services are used extensively by small businesses and people who work at home. Such call forwarding services are particularly useful in business emergency situations, where the sole proprietor must be mobile.

Generally, call forwarding services are limited to POTS (plain old telephone service) lines and cannot be applied to trunks or other types of facilities access to the subscriber's location. As an example, we will refer to a brokerage firm that has multiple offices. If one of the offices has a problem with staffing a particular telephone number (such as the "new order" number) over a particular period of time, then call forwarding services could be used to forward the calls from the office with the problem to a different office. By forwarding the calls, the brokerage firm will continue to receive new orders and will avoid losing the business. However, if more than one office had a staffing problem, call forwarding would not suffice to distribute the load of extra calls. As a result, other redirection services have been developed to handle the more complicated problems of businesses that may face communication service disruption as a result of interruption in the communication service itself or as a result of problems in handling the communications at the business.

One redirection service that has been developed to handle the complicated communication requirements of a business in an emergency is the CRISISLINK service offered by BellSouth Telecommunications, Inc., Atlanta, Ga. The CRISISLINK service is a network based service which allows a subscriber to redirect all calls or a selectable percentage of calls during an emergency or during specified times from directory numbers to one or more alternate ("backup") numbers previously selected by the subscriber. The subscriber may choose to have all calls to the directory number or numbers redirected to a particular backup number, or have a selectable percentage of the calls spread amongst two or three backup numbers. In other words, a subscriber may have 100% of the calls redirected to backup number #1. For example, this option may be desirable to the brokerage firm when one of the offices is having a problem with staffing a particular number or group of numbers. Alternatively, the subscriber may have the calls spread amongst other backup numbers. An example of the spread of calls amongst three backup numbers follows below:

20% of the calls redirected to backup #1
    30% of the calls redirected to backup #2
    50% of the calls redirected to backup #3

For example, if the problem office has a particularly busy day, then it may make sense to distribute the calls from the problem office amongst three different offices. In this way, none of the other offices is particularly overwhelmed by the added number of calls. The ability to distribute the calls amongst one or more backup numbers provides the CRISISLINK subscriber with greater flexibility in handling emergencies or other events that may cause a disruption to communication services at the location associated with the directory number.

The CRISISLINK service also provides its subscribers with the option of having all calls receive a preselected announcement instead of being redirected, or of having a selectable percentage of the calls receive a preselected announcement with the remaining percentage of calls being redirected to one or more backup numbers. For example, the subscriber may have calls spread amongst a preselected announcement and three backup numbers as follows:

10% of the calls receive a preselected announcement
    20% of the calls redirected to backup #1
    30% of the calls redirected to backup #2
    40% of the calls redirected to backup #3

Referring again to the brokerage firm, the firm may take advantage of the announcement feature of the CRISISLINK service to provide 10% of the calls to the problem office with an announcement. An announcement may be particularly advantageous in providing callers with pertinent information as a stop gap measure or as a sales tool at least until a backup number is ready to handle this percentage of calls. The ability to provide a percentage of calls with an announcement provides the CRISISLINK subscriber with greater flexibility in handling emergencies or other events that may cause a disruption to communication services at the location associated with the directory number.

Further, the CRISISLINK service allows the subscriber to choose to redirect or provide an announcement to only a percentage of the calls that are directed to the directory number while the remaining percentage are directed as dialed to the directory number. For example, the subscriber may have the calls spread amongst the directory number, a preselected announcement and three backup numbers as follows:

10% of the calls are directed to the directory number
    10% of the calls receive a preselected announcement
    20% of the calls redirected to backup #1
    30% of the calls redirected to backup #2
    30% of the calls redirected to backup #3

Referring again to the brokerage firm, the problem office may actually be able to handle a reduced number of calls. Thus, the brokerage firm may choose to leave 10% of the calls with the problem office, provide 10% of the calls with an announcement, and then distribute the remaining calls to three other offices.

In addition, the CRISISLINK service allows the subscriber to change the percentage of call redirection as the situation develops. For example, the staffing at the problem brokerage office may be a short term problem. As the staffing problem improves, the brokerage firm may dynamically change the percentage of call redirection. For example, the percentage of calls that are left to be directed to the directory number may gradually be increased until the problem office no longer is a problem. In this manner, the brokerage firm may gradually restore the original telephone plan so as to better protect its business at that office. A subscriber of CRISISLINK service has greater flexibility in handling emergencies or other events that may cause a disruption to communication services at the location associated with the directory number because of the following features provided by the service: the ability to leave a selectable percentage of calls with the dialed directory number; the ability to provide an announcement to a selectable percentage of the calls; and the ability to distribute the calls amongst one or more locations.

The CRISISLINK service advantageously operates in a fashion transparent to customers within the Advanced Intelligent Network (AIN), an intelligent switched telephone network used by BellSouth Telecommunications, Inc. Also, as a network based service, the CRISISLINK service advantageously operates with all types of telephone and communications service including multiline hunt groups, direct-inward-dial (DID) lines, ESSX service, the ISDN Primary Rate Interface, as well as with POTS (Plain Old Telephone Service), and any type of facilities access. The CRISISLINK service is independent of facilities access because it intercepts the communication as it enters the network for local routing.

As noted above in connection with the brokerage firm example, the situation giving rise to the disruption in communication services (emergency or resource management) may change, and hopefully improve, as time passes. The hurricane may miss the area of the subscriber's business, or the staffing problem may be solved by resolution of a strike or for some other reason. The change or improvement in the situation may necessitate a change in the communication services to that business, social, health or educational institution, or a return to the original communication service provided. In other words, the change or improvement may point to a cancellation or at least partial cancellation of communication redirection services.

In addition, the situation at the location of the redirected directory number or numbers may be such that communication with people or devices at the location may be highly desirable. For example, it would be very useful to the brokerage firm to keep in touch with the few people who are actually staffing the problem office so as to monitor the staffing requirements and other issues that may arise as a result of the problems associated with that office. Further, emergency situations may be better handled if the communications link with the problem location is maintained. For example, if a fire alarm results in the evacuation or partial evacuation of the problem brokerage office, then it would be useful to the brokerage firm to be able to keep in touch with the problem office. In this way, the brokerage firm would have information quickly as to the magnitude of the problem at the problem office. The fire may just be a small fire that is quickly brought under control (such as a fire in a wastebasket), or the fire may be a major conflagration that threatens the entire neighborhood. The response of the brokerage firm with respect to the cancellation or partial cancellation of redirection services would be different based upon the information that may be gained from the vital communications link with the problem office.

How is the person in charge of the communication services to know when the communication redirection service should be cancelled or at least changed? When should communication services be "un-redirected" or at least partially "un-redirected"?

Under present communication redirection services similar in nature to those provided by regional Bell operating companies (RBOCs) and 800 service providers, there is no way for the person in charge of communication services to know when communication redirection services should be cancelled or changed. The person in charge cannot simply place a call to the redirected directory number to check out the normal undirected service. Any such communication directed to the directory number is redirected to another number(s), as may be specified by the subscriber in accordance with the redirection service. The subscriber cannot get through to the telephone or other piece of equipment associated with the dialed directory number. With such redirection services, the vital communications link to the problem office is severed. Thus, there is no way to know or to judge when to "un-redirect" redirection services.

Pursuant to present communication redirection services, the person in charge of communications is left with a digital decision: leave the redirection service "on" or turn the redirection service "off". If the redirection service is prematurely cancelled, then the business, social, health or educational institution faces the problems associated with the emergency or resource management problems that gave rise to implementation of the redirection service. With respect to a business, business opportunities may be lost, customers discouraged, sales missed, service calls ignored, etc. With respect to resource management problems, premature cancellation of communication redirection services may simply exacerbate the problems. For example, if calls are "un-redirected" to the problem office, then the problem office must be ready to accept such calls and must be staffed with its complement of sales associates. If the chronic understaffing of the problem office led to the communications disruption, then the "un-redirection" of the calls may only further depress sales associate morale, disappoint (or even offend) customers who cannot reach the problem office, and overburden management. On the other hand, if the redirection service is left on too long, a parallel set of problems will come about that are associated with the overlong use of the redirected directory numbers and associated personnel, and with the underuse of the directory numbers and associated personnel.

The person in charge of communication services may be provided with clues to help with the decision to cancel redirection services. For example, with respect to call forwarding services, when the family returns home from vacation, this return is a pretty big clue that the implemented call forwarding service should be cancelled. Grandma now can reach the family at home, and not at the beach. But what of the more complicated examples of communication service disruptions such as the emergencies that may arise as a result of natural disasters or resource management problems? Certainly, clues will be available. The weather report may indicate that the hurricane missed the area of the subscriber's business, or the news may provide information that a labor strike has been settled. However, such clues are meager and serve as an insufficient basis for important communication service decisions. In addition, such clues may be too slow or altogether too late in coming.

Pursuant to present redirection services, including call forwarding, there is no way to put a test call through to the directory number. All the calls to the directory number are redirected. Test call capability in connection with redirection services would be advantageous for a number of reasons. In the case of communication disruptions that result from emergency situations such as weather disasters, it would be helpful to know whether the telephone and other communication services have been restored within the area that was struck by the emergency. In emergency situations, the restoral of telephone service to an area serves as an indicator of at least two things. First, such restoral generally indicates that the situation has normalized to the extent that rescue crews and others such as homeowners and small business proprietors can return to the area. Second, such restoral indicates that telephones and other communication services are available as tools to be used in recovery from the emergency and as tools in the resumption of business and life after the emergency.

In the case of resource management issues, it would be helpful to know whether communication services continue to be disrupted and the extent of the disruption. Referring again to the brokerage firm example, the determination of the percentage of calls (if any) to be handled by the problem store could be made on the basis of the number of test calls that are handled properly by the staff at the problem office. For example, if the staff picked up one of every ten test calls, then a distribution of 10% of the calls to the problem office may constitute an acceptable risk to the chain.

Further with respect to the issue of the extent of the disruption to communication services, it would be helpful in certain situations to know the status of any particular directory number or numbers of a subscriber without disrupting the communication redirection service applied to that directory number or any other directory numbers of the subscriber. For example, if the brokerage firm applied a redirection service with respect to all the directory numbers associated with the problem office (new orders, personal numbers, information numbers, etc.) it would be helpful to the chain to find out if the manager of the problem office is answering his/her directory number without "un-redirecting" all of the numbers associated with the problem office. If the manager's telephone is being answered, the brokerage firm may "un-redirect" that directory number so that the brokerage firm and manager could work on the staffing problem together. If the manager's telephone goes unanswered, the brokerage firm may continue the redirection service so as to better serve its business interests.

Accordingly, there is a need in the art for the capability of checking the status of communication services with respect to a directory number or numbers to which redirection services have been applied. Further, there is a need in the art for the capability of checking such status with respect to a particular directory number without disrupting the redirection services to that number or to other directory numbers. In addition, there is a need for the capability of checking such status that is relatively inexpensive, that does not require on-premises equipment, that is easy to use, and that is easy to maintain and service.

SUMMARY OF THE INVENTION

As will be seen, the present invention satisfies the foregoing criteria. Stated generally, the method and system of the present invention allow a communication directed to a particular directory number to bypass the redirection service applied to the directory number so as to reach the dialed directory number, rather than the redirected number. Stated more particularly, the present invention operates in connection with an intelligent switched telephone network wherein a redirection service is operative with respect to communications directed to a directory number to direct the communications away from the directory number to at least one other directory number. The method of the present invention receives a communication from a source. The communication is directed to the directory number to which the redirection service is applied. The present invention reads the identification information associated with the communication. The identification information is compared to entries in a database of subscriber information maintained by the network for an entry matching the identification information. In response to finding the matching entry, the entry is read for a bypass feature. The presence of the bypass features indicates that the source of the communication is to be given an option of bypassing the redirection service and of having the communication routed to the directory number. If the bypass feature is not found, then the preferred embodiment of the present invention routes the communication pursuant to the redirection service.

In response to finding the bypass feature, the source of the communication is preferably provided with an announcement and then accorded a predetermined time interval for an opportunity to enter a password. The entry of the password indicates a desire by the source to take advantage of the bypass option. In response to the entry of the password, the password's validity is checked against the database of subscriber information. If the password is invalid, the preferred embodiment of the present invention routes the communication pursuant to the redirection service. If the password is valid, the communication is routed to the directory number so that the communication effectively bypasses the redirection service.

Stated even more particularly with respect to the system of the present invention, the system includes a switch which is operative to receive a communication in the intelligent switched telephone network. The communication is directed to the directory number to which the redirection service has been applied. The switch reads the identification information associated with the communication and provides the identification information to a service control point that is functionally connected to the switch. In addition, the service control point includes a database of subscriber information maintained by the network. The service control point reads the identification information for the presence of the directory number and searches for a matching entry to the directory number in the database of subscriber information. In response to finding the matching entry, the service control point reads the matching entry for a bypass feature. The bypass feature indicates the availability of an option of bypassing the redirection service and of having the communication routed to the directory number. In response to failing to find the bypass feature, the service control point preferably provides the switch with redirection routing instructions to route the communication pursuant to the redirection service. And in response to receiving the redirection routing instructions, the switch routes the communication pursuant to the redirection service.

In response to finding the bypass feature, the service control point provides the switch with password collection instructions. The switch preferably responds to the password collection instructions from the service control point by providing an announcement. In the preferred embodiment, the announcement provides the subscriber with an unobstrusive indication (or "clue") that a password is to be entered to have the communication routed to the directory number. To other unauthorized callers, the announcement is preferably unobtrusive or transparent as just another telecommunications announcement so that these unauthorized callers are not made aware of the bypass feature by the announcement. After the announcement, the switch preferably receives the password from the subscriber through the entry of dual tone multifrequency (DTMF) digits. The entry of the password indicates a desire to bypass the redirection service for the communication. The switch responds to the entry of the password by providing the password to the service control point. The service control point responds to receipt of the password by checking the validity of the password in the database of subscriber information. If the service control point finds the password invalid, then the service control point provides the switch with redirection routing instructions to route the communication pursuant to the redirection service. The switch responds to the redirection routing instructions by routing the communication pursuant to the redirection service. If the service control point finds the password is valid, then the service control point provides the switch with routing instructions to route the communication to the directory number. The switch responds to the routing instructions by routing the communication to the directory number.

Advantageously, the present invention provides the capability of checking the status of communication services with respect to a directory number or numbers to which redirection services have been applied. In particular, the present invention provides the capability of checking the status of communication services with respect to a particular directory number without disrupting the redirection services. In addition, the present invention provides the described capability in a manner that is relatively inexpensive, that does not require on-premises equipment, that is easy to use, and that is easy to maintain and service.

Therefore, it is an object of the present invention to provide an improved method and system for routing a communication to a dialed directory number through a bypass of the redirection service applied to the directory number.

That the present invention and the preferred embodiment thereof overcome the drawbacks set forth in the background and accomplish the objects of the invention set forth herein will become apparent from the detailed description of the preferred embodiment to follow.

BRIEF DESCRIPTION OF THE DRAWINGS

FIG. 4 is a decision graph illustrating the preferred general method of the preferred embodiment of the present invention as it interfaces with a redirection service.

DETAILED DESCRIPTION

Figure 1:
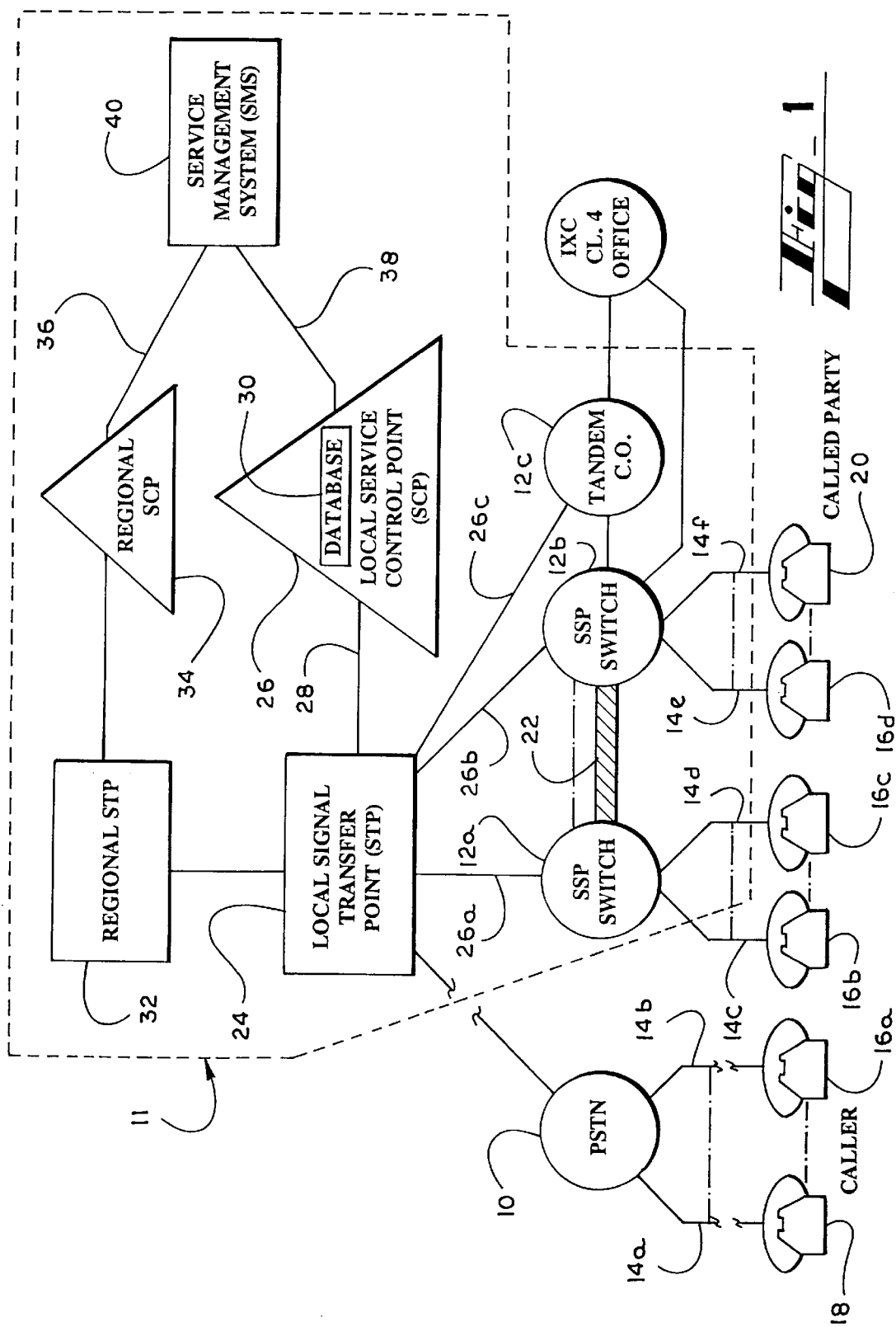
FIG. 1 is a block diagram illustrating the preferred environment of the preferred embodiment of the present invention.

Stated generally, the method and system of the present invention allow a communication directed to a particular directory number to bypass the redirection service applied to that directory number so that the communication reaches that directory number, rather than a redirected number. Advantageously, this method and system allow a subscriber to check or test the communications service that is provided to the directory number. Reference is made to the example of the brokerage firm discussed in the background, where the brokerage firm applied a redirection service to all directory numbers associated with a problem office. Pursuant to the present invention, the brokerage firm may check the status of any one of the problem office's directory numbers without disturbing the redirection service applied to the directory number that is being tested or any of the other directory numbers. For example, the brokerage firm may check the status of the directory number associated with the manager of the problem office, and if the status is acceptable, remove the redirection service from that directory number. Cancellation of the redirection service from the manager's directory number advantageously allows the brokerage firm and the manager to handle together whatever situation led to the application of redirection services. Without the test call capability to check the status of the manager's directory number, the management of the brokerage would not know whether it was a good business risk to remove the redirection service from the manager's directory number.

Stated more particularly, in an intelligent switched telephone network, the present invention receives a communication that is directed to a directory number which has redirection services applied to it. The present invention reads the identification information associated with the communication. The identification information is compared to entries in a database of subscriber information maintained by the network for an entry matching the identification information. If a matching entry is found, the entry is read for the presence of a bypass feature. This features indicates that the source of the communication is to be given an option of bypassing the redirection service and of having the communication routed directly to the directory number. If the entry does not include the bypass feature, then the communication is preferably routed pursuant to the redirection service. If the entry includes the bypass feature, then the source of the communication is preferably accorded an opportunity to enter a password. The entry of the password indicates a desire by the source to take advantage of the bypass option. In response to the entry of the password, the password's validity is checked against the database of subscriber information. If no password is received, or if the password is invalid, then the communication is preferably routed pursuant to the redirection service. If the password is valid, the communication is routed to the directory number so that the communication effectively bypasses the redirection service.

DESCRIPTION OF THE PREFERRED ENVIRONMENT OF THE PREFERRED EMBODIMENT

Referring now to the drawings, in which like numerals indicate like elements throughout the several figures, FIG. 1 is a block diagram illustrating the public switched telephone network (PSTN) 10 and an illustrative portion 11 of the PSTN. In particular, the portion 11 of the PSTN illustrates a part of the Advanced Intelligent Network (AIN) of a typical local exchange carrier, which is the preferred environment of the preferred embodiment of the present invention.

The Advanced Intelligent Network comprises a plurality of central offices, which are indicated as SSP switches 12a, 12b in FIG. 1. "SSP" is an acronym for service switching point. A service switching point is a switch, (specifically a Class 5 central office) and the terms are used interchangeably herein. In the preferred embodiment, the service switching point is equipped with AIN software release 0.1 or higher release. For more information, see Bellcore Specification TR-NWT-001284 Switching Systems Generic Requirements for AIN 0.1, which is incorporated herein by reference. The dashed lines between the switches 12a, 12b indicate that the number of switches is arbitrary. The Advanced Intelligent Network also comprises non-SSP central office switches, but such non-SSP switches are not shown in FIG. 1. The difference between an SSP and a non-SSP switch is that an SSP includes intelligent network functionality including appropriate hardware and software so that, when a set of predetermined conditions are detected, the SSP initiates a trigger for a predetermined state of a call on a subscriber's directory number, generates the trigger as an appropriate message to be sent out over the SS7 network, and suspends handling of a call until the SSP receives a reply from the network instructing the SSP to take certain action. If the SSP receives no instructions within a certain amount of time, the SSP has a default task to execute with respect to the predetermined condition. A non-SSP switch is an electronic switch that can generate certain rudimentary data packets and provide them over the network, but the non-SSP switch must rely on other equipment to provide subscriber lines connected to such a non-SSP switch with more complex features and services available in the Advanced Intelligent Network.

As is well known to those skilled in the art, the Advanced Intelligent Network also includes a tandem switch (also referred to as a "tandem central office") which interconnects local offices, SSPs and interexchange carriers (IXCs). In particular, if an interoffice trunk or an IXC trunk to an SSP becomes unavailable or overloaded, an alternate routing plan can go into effect so that calls are processed through the tandem attempting to reach the SSP. As alternate routing paths, the tandem switches include the same equipment and are provided with the same information available to their respective SSPs. In the case of a problem with accessing a particular SSP, the SSP's alternate route through the tandem may be taken until the problem is resolved. FIG. 1 illustrates the tandem switch 12c that is associated as will be well known to those skilled in the art with SSP 12b and with IXC 13 (which is a Class 4 office). The present invention preferably operates with the deployment of either the SSP, such as SSP 12b, or its tandem, such as tandem 12c.

As further illustrated in FIG. 1, SSP switches 12a, 12b have a plurality of subscriber lines commonly designated as 14 connected thereto. Typically, the number of subscriber lines serviced by each switch is on the order of 10,000 to 70,000 lines. Each subscriber line 14 is connected to a piece of terminating equipment including a plurality of telephones commonly designated as 16. Although telephones are illustrated as the pieces of terminating equipment in FIG. 1, those skilled in the art will understand that such pieces include other telecommunication devices such as facsimile machines, computers, modems, etc. In particular, the telephones 16a, 18 are shown as connected by broken subscriber lines 14a, 14b to PSTN 10 to indicate that these subscriber lines and pieces of terminating equipment represent lines and equipment that exist in a conventional manner within the network and that operate with the present invention, but that are not necessarily connected to SSPs 12a, 12b. In addition, one of the illustrated telephones 18 is designated as corresponding to the calling party,(also referred to as "caller" or as "source"). Another of the illustrated telephones 20 is designated as corresponding to the called party. Both of these designations will become useful in the description of the preferred embodiment as set forth below. By way of example, FIG. 1 illustrates that the telephone of calling party 18 is connected via subscriber line 14a to PSTN 10, and the telephone of called party 20 is connected via subscriber line 14f to SSP 12b.

Pursuant to the preferred embodiment, each piece of terminating equipment in an intelligent switched network is assigned a ten digit directory number. In the description of the present invention, the term "directory number" is used in its generally understood meaning to be the number which is dialed or input by a caller or source to reach a piece of terminating equipment associated with the dialed directory number. A directory number is commonly referred to as a telephone number. It should be noted that a piece of terminating equipment's directory number is not necessarily unique, but may be shared by a group of pieces of terminating equipment. For example, a household may include several different telephones, a facsimile machine and a computer with a modem. It is likely that the several telephones in the home will all be assigned the same directory number so that a call that terminates at the home may be conveniently answered at any of the telephones in the home. However, it is likely that the facsimile machine and the computer will each have a different directory number from the directory number assigned to the home telephones. These numbers may be different because the telecommunication services provided to the facsimile machine and to the computer may be billed differently from the telephones, or be serviced differently from the telephones, or may be set up so that their use does not interfere with the telephones.

Referring again to FIG. 1, switches 12a, 12b are interconnected by a plurality of trunk circuits indicated as 22 in FIG. 1. These are the voice path trunks that interconnect the central office switches to connect communications. The term "communication" is used herein to include all messages or calls that may be exchanged between caller and called party in the network illustrated in FIG. 1. It should be understood that central office trunking in a typical urban environment is not limited to a daisy chain arrangement implied by FIG. 1. In other words, in a typical network, trunk circuits exist between central office switch 12a or 12b and the central office switch(es) (not shown) servicing the pieces of terminating equipment 16a, 18.

Each of the SSPs in the network including switches 12a, 12b and tandem 12c is connected to a local signal transfer point (STP) 24 via respective data links 26a, 26b and 26c. Currently, these data links are 56 kilobit per second bidirectional data links employing a signaling protocol referred to as Signaling System 7 (SS7), which is well known to those skilled in the art. STP 24 is simply a multi-port high speed packet switch that is programmed to respond to the routing information in the SS7 protocol, and route the packet to its destination. STPs are conventionally installed in redundant pairs (like the tandem central offices) with accompanying data links. The redundant devices are not illustrated for sake of simplicity in the drawings.

Much of the intelligence of the Advanced Intelligent Network resides in the local service control point (SCP) 26 that is connected to STP 24 over SS7 data link 28. As is known to those skilled in the art, SCPs are physically implemented by relatively powerful fault tolerant computers. Typical implementation devices include the Star Servicer FT Model 3200 or the Star Server FT Model 3300, both sold by American Telephone & Telegraph Company. Typically, SCPs are provided in redundant pairs. Among the functions performed by SCPs is the maintenance of network databases which are used in providing services. In addition, SCPs include databases such as the illustrated subscriber information database 30 that identify particular service subscribers and the services to be accorded to these subscribers.

In order to keep the processing of data and calls as simple as possible, a relatively small set of triggers is defined at the switches for each call. A trigger in the Advanced Intelligent Network is an event associated with a particular subscriber line that generates a packet to be sent to an SCP. The trigger causes the SCP to query its database to determine which customized calling feature or enhanced service should be implemented for this particular call. The results of the database inquiry are sent back to the switch from SCP 26 through STP 24. The return packet includes instructions to the switch as to how to process the call. The instruction may be to take some special action as a result of a customized calling service or enhanced feature. In response to receiving the latter type message, the switch moves through its call states, collects the called digits, and generates further packets that are used to set up and route the call. Similar devices for routing calls among various local exchange carriers are provided by regional STP 32 and regional SCP 34.

Both regional SCP 34 and local SCP 30 are connected via respective data links 36 and 38 to a service management system (SMS) 40. The SMS 40 also is implemented by a large general purpose computer and interfaces to business offices of the local exchange carrier and interexchange carriers. The SMS downloads information to the databases of SCPs 30 and 34 when subscribers set up or modify their ensemble of AIN services. Similarly, SMS 40 downloads on a non-realtime basis, billing information that is needed in order to appropriately invoice subscribers for the services provided.

General Operation of the Preferred Embodiment in the Preferred Environment

The preferred embodiment of the present invention operates in the above described environment as illustrated in FIG. 1, and further, operates in connection with the application of redirection services to A selected directory number. In particular, the preferred embodiment operates in connection with the CRISISLINK redirection service generally described in the background. Further information about the CRISISLINK redirection service may be obtained from the document entitled "CRISISLINK Service, Questions & Answers, 'Protecting Your Connection to the World When You Need It The Most', BellSouth Service Systems, Atlanta, Ga. 1995,", which is incorporated herein by reference.

To provide a detailed explanation of the present invention, it will be understood that a redirection service has been applied to a particular directory number such that all calls directed to that directory number are redirected pursuant to a redirection plan as specified by the redirection service. As explained in the background, it will be appreciated that the CRISISLINK service may be applied based on a plan such that a group of directory numbers as specified by a subscriber may be insured against disruption in communication services. Nevertheless, the present invention is described in the context of a single directory number. Those skilled in the art will understand that the present invention may be used on a wider scale with respect to a plurality of directory numbers and in other settings than as described herein.

To describe the preferred embodiment, it will be appreciated that the present invention receives at a service switching point a communication from a calling party 18. The communication is directed to called party 20, who may be an individual, or which may be a business, social, health or educational institution. The communication is directed to the called party 20 through use of a directory number (also referred to as a "called party number") such as a telephone number entered by the calling party 18 and associated with the communication in a manner well known to those of ordinary skill in the art. Preferably, the communication is routed from the receiving SSP through the Advanced Intelligent Network on the basis of the directory number until the communication reaches a service switching point 12b, which serves communications directed to that directory number.

Associated with the communication in a conventional manner is identification information. The identification information may include the calling line number such as the telephone number associated with the telephone where the communication was initiated or placed. The identification information also will include the directory number such as the telephone number associated with the telephone of the called party. This identification information is read in a manner well known to the art by elements of the Advanced Intelligent Network, including service switching points, as the communication is routed from the calling party 18 to the called party 20. With respect to the present invention, the service switching point that serves the "dialed" directory number preferably reads the identification information and checks with its associated service control point for instructions. Thus, as illustrated in FIG. 1, if calling party 18 initiates a communication directed to the directory number associated with called party 20, the communication will reach service switching point 12b, which then reads the identification information associated with the communication. After reading the information, the service switching point 12b provides the service control point 26 with the identification information. The inclusion and reading of information to trigger special handling of a communication is well known to those skilled in the art. Preferably, switching point 12b provides service control point 26 via signal transfer point 24 with the identification information associated with the communication.

Service control point 26 maintains a routing list for directory numbers having special services. In the preferred embodiment, the service control point 26 comprises a subscriber information database 30 including entries of directory numbers associated with calling lines accorded special treatment such as redirection services. Generally, a service control point does not include information about all subscribers to all services, or even all subscribers to any particular service, within its subscriber information database. Rather, a service control point usually stores information in its subscriber information database relating to the subscribers with directory numbers that are handled by service switching points within the purview of the service control point's responsibilities. In other words, a service control point would not have information about a directory number that is handled by a service switching point that is serviced by a different service control point. The limitation of the information in a subscriber information database maintained by a local service control point is well known in the art, conserves the resources of the particular service control point, and speeds communication processing.

Generally, service control point 26 compares the identification information received from switching point 12b with entries in the database 30 in order to determine whether the communication is to receive special services. In particular, the directory number associated with the communication as part of the identification information is identified. The service control point 24 compares this directory number with entries in the database 30 in order to determine whether the communication directed to this directory number should receive special services.

If a matching entry for special services is not found, the service switching point 12b provides the communication with default treatment by routing the communication without special services. If a matching entry for special services is found, the service control point 26 notes from the matching entry that redirection services have been applied to the directory number. The service control point 26 further reads the matching entry for the presence of a bypass feature (also referred to as "test call capability"). The presence of the bypass features indicates that the source of the communication is to be given an option of bypassing the redirection service and of having the communication routed to the directory number. If the bypass feature is not found, then the preferred embodiment of the present invention routes the communication pursuant to the redirection service.

If the bypass feature is found by the service control point 26, then the service control point preferably provides the service switching point 12b with password collection instructions. In the preferred embodiment, the password collection instructions instruct the service switching point to play an announcement, to wait a predetermined time interval for the entry of the password and to collect the password. Preferably, the announcement states: "One moment please". The preferred predetermined time interval is three seconds. The preferred password is a four digit password that is entered by the source of the communication after the announcement during the predetermined time interval. The service switching point 12b collects the entered digits and provides them to the service control point 30. The service control point then checks the validity of the password in the database 30 of subscriber information. If the source fails to enter the password within the predetermined time interval, or if the service control point 26 finds the password invalid, then the preferred embodiment of the present invention routes the communication pursuant to the redirection service.

If the service control point 26 finds the password is valid, then the service control point 26 provides the service switching point 12b with routing instructions to route the communication to the directory number. The service switching point responds to the routing instructions by routing the communication to the directory number.

Figure 2:
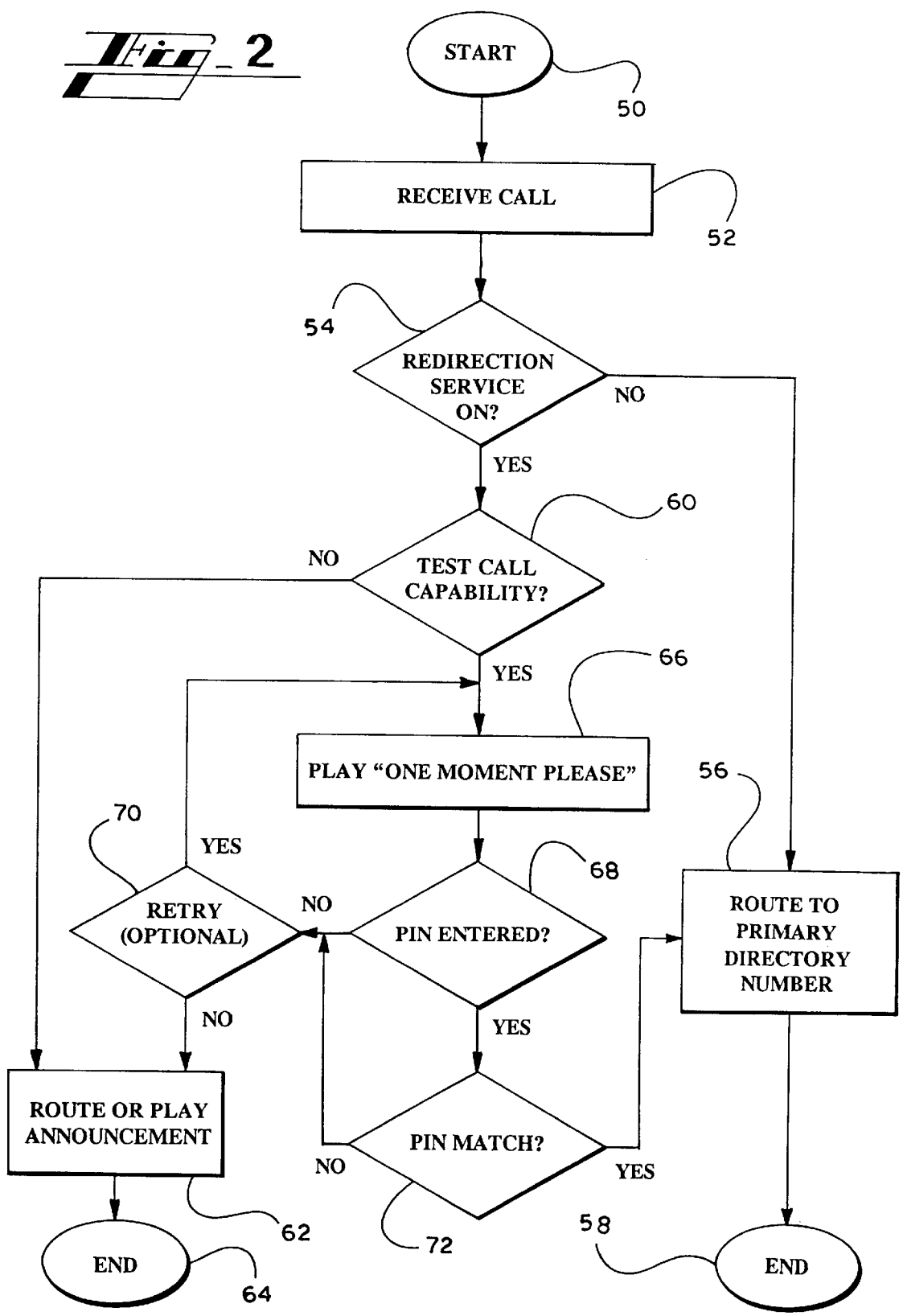
FIG. 2 is a flow chart illustrating the preferred general method of the preferred embodiment of the present invention.
Figure 3:
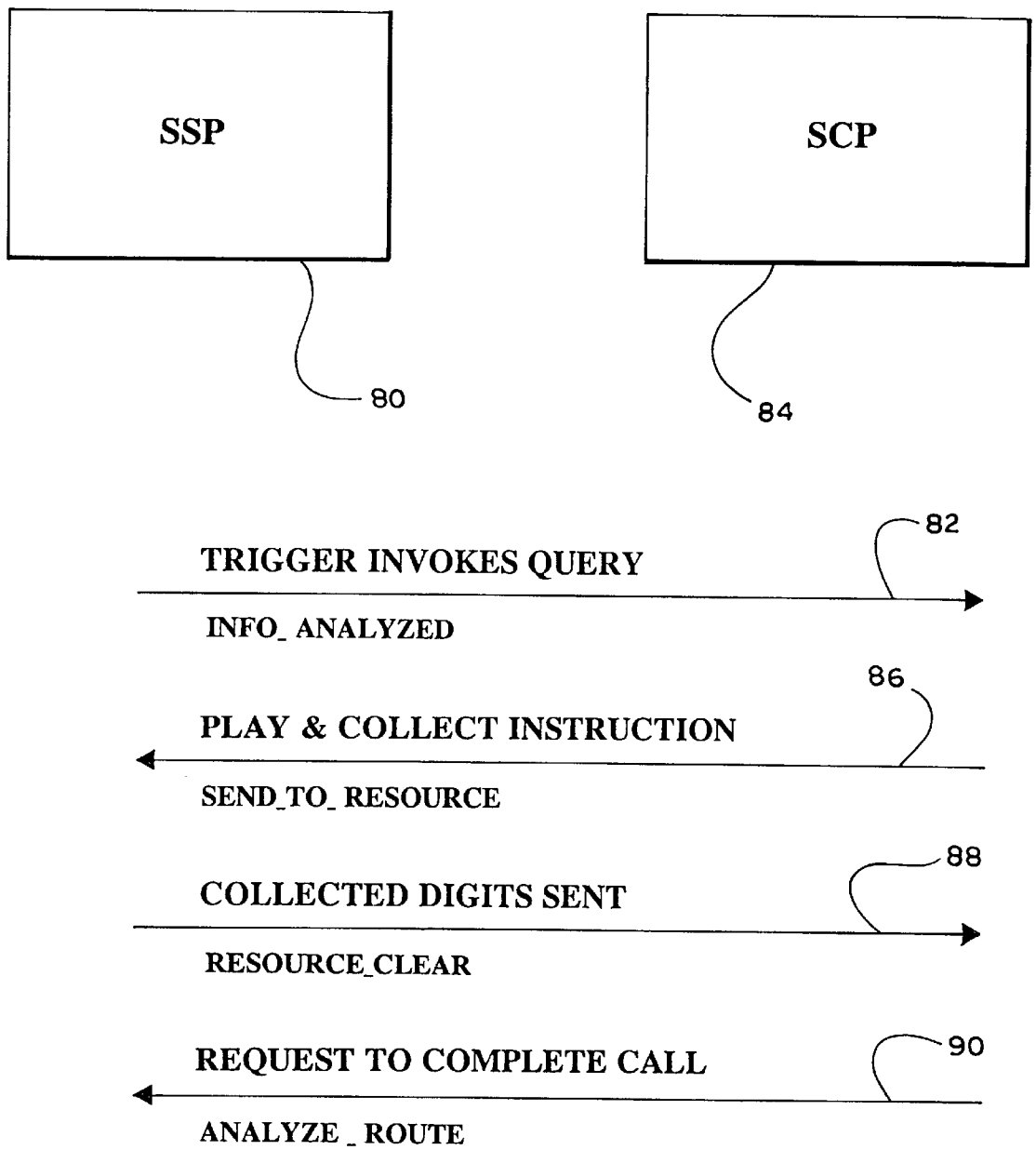
FIG. 3 is a block diagram illustrating a TCAP message sequence between network devices for use in implementing the preferred embodiment of the present invention.

Description of the Preferred Embodiment Using a Flow Diagram, Message Sequence and a Decision Graph The flow chart, message sequence and decision graph of FIGS. 2–4 provide a detailed description of the process steps executed by the preferred embodiment of the present invention. Using an analogy to electrical circuit diagrams, these figures are equivalent to a detailed schematic for an electrical circuit where the provision of the circuitry for electrical circuit blocks corresponds to provision of actual computer instructions for blocks of the flow chart. Thus, the coding of the process steps of these figures into instructions for suitable commercially available computers is a mere mechanical step for an engineer or other person skilled in the programming art.

FIG. 2 is a flow chart illustrating the preferred general method of the preferred embodiment of the present invention.

FIG. 2 is entered at step 50, and in step 52, the present invention receives a communication from a source. The source may be a person or calling party such as the calling party 18 illustrated in FIG. 1, or the source may be a telecommunications device. For illustrative purposes, it will be assumed that the source is the calling party 18. Preferably, the source uses any touch-tone telephone to dial in a directory number to direct the communication. The communication works its way through the network in a manner well known to those skilled in the art until it reaches the network device servicing the dialed directory number In step 54, the identification information associated with the communication is read in a conventional manner, and is checked for special handling instructions. The inclusion and reading of information to trigger special handling of a communication in the Advanced Intelligent Network is well known to those skilled in the art. In particular, the service switching point checks whether a redirect trigger is present with respect to the dialed directory number such that the communication is subject to redirection services. If there are no special handling instructions associated with the identification information, in step 56 the present invention routes the communication in a conventional manner to the dialed directory number, and proceeds to end in step 58.

If there are special handling instructions associated with the identification information, then in step 60 a determination is made as to whether the special handling instructions include a bypass feature, also referred to as "test call capability". As explained above, the test call capability or bypass feature is a method and system that allows for the bypassing of the redirection service applied to the dialed directory number so that the communication may reach the dialed directory number, rather than a redirected number. Advantageously, this method and system allow a subscriber to check or test the telecommunications service that is provided to the directory number. If the test call capability determination in step 60 is negative, then in step 62 the present invention routes the communication in accordance with the redirection service, and proceeds to end in step 64. If the test call capability determination in step 60 is positive, then in step 66 the source of the communication is provided with the announcement: "One moment please". The source also is provided with an opportunity to invoke the test call capability by the input of a password or "PIN" (personal identification number) during a predetermined time interval following the announcement. In step 68, the present invention checks whether the PIN has been entered. If not, then in step 70 the present invention checks whether it should execute the optional step of providing the source another opportunity to invoke the test call capability. If not, then in step 62 the present invention routes the communication in accordance with the redirection service, and proceeds to end in step 64. If the source is to have another opportunity to invoke the test call capability, then the present invention repeats steps 66 and 68.

Referring again to step 68, if a PIN has been entered, then in step 72 the present invention checks whether the PIN matches information maintained by the network that indicates that the source of the PIN is authorized to invoke the test call capability. If the PIN does not match, then the present invention proceeds to step 70 to check whether it should execute the optional step of providing the source another opportunity to invoke the test call capability, as explained above. If the PIN matches, then in step 56 the present invention routes the communication in a conventional manner to the dialed directory number, and proceeds to end in step 58.

FIG. 3 is a block diagram illustrating the TCAP message sequence between network devices for use in implementation of the preferred embodiment of the present invention.

As explained above, the preferred embodiment of the present invention operates in the Advanced Intelligent Network through a service switching point and a service control point that serve the directory number dialed by the source of the communication. FIG. 3 illustrates the transaction capabilities application part (TCAP) messages that are exchanged in a conventional manner between a representative service switching point and a service control point in the method and system of the preferred embodiment. As illustrated in FIG. 3, the communication is received in service switching point 80, which reads the identification information associated in a conventional manner with the communication. As further illustrated by the arrow 82 from the service switching point 80 to the service control point 84, the presence of a public office dialing plan (PODP) trigger on the directory number invokes a query in a conventional manner to the service control point 84 as represented by the conventional instruction "Info_Analyzed". The service control point 84 checks its subscriber information for a matching entry to the directory number provided as part of the identification information from the service switching point. The matching entry indicates that the directory number is to be accorded special services, and in this example, redirection services. The service control point 84 further checks the information associated with the matching entry for a bypass feature that indicates that the source of the communication is to be given the opportunity to invoke test call capability. When the service control point 84 finds the bypass feature, the service control point returns a "Send_to_Resource" message as indicated by arrow 86 to the service switching point 80. In particular, the service control point 84 instructs the service switching point 80 to play an announcement and to collect PIN digits from the source of the communication. The service switching point 80 follows these instructions and returns a "Resource_Clear" message indicated by arrow 88 with the collected digits to the service control point 84. The service control point 84 then checks whether the collected PIN digits constitute a valid password. If so, then the service control point returns a "Analyze_Route" message as indicated by arrow 90 to the service switching point 80 to complete the call to the dialed directory number.

FIG. 4 is a decision graph illustrating the preferred general method of the preferred embodiment of the present invention as it interfaces with a redirection service.

In particular, FIG. 4 illustrates the general method of the preferred embodiment as it interfaces with the CRISISLINK service described in the background. As noted, the CRISISLINK service is offered by BellSouth Telecommunications, Inc. and the service operates on the Advanced Intelligent Network as described in FIG. 1. In the preferred embodiment, a decision graph is completed with information relevant to each subscriber and/or each directory number that is to be accorded CRISISLINK service, and in particular, that is to be accorded test call capability. The decision graph for a particular subscriber is created and input by administrative personnel based on information provided by the subscriber. The decision graph is created and input in a conventional manner to interface with services provided to the directory number through the service management service (SMS) 40 that was described above in connection with the Advanced Intelligent Network in FIG. 1. Once the decision graph for a particular subscriber (or directory number) has been created and input at the SMS, the decision graph then is transferred to the local service control point (such as SCP 26) that services the service switching point that, in turn, services the directory number which is the subject of the decision graph. Typically, such decision graphs are stored by a service control point in a subscriber information database such as the database 30 illustrated in FIG. 1. When information is needed by the service control point to provide instructions for the processing of a communication, the service control point accesses the database and traverses the decision graph in a conventional manner.

Referring to FIG. 4, the illustrated decision graph begins at root block 120, proceeds to start 122, and indicates at the block 124 whether redirection services are "ON" or "OFF". In FIG. 4, the "0" adjacent to block 126 ("Connection Service Off") indicates that the redirection service is "OFF", i.e., all communications are to be routed to the directory number. In other words, the subscriber has cancelled (or has not as yet implemented) the communication redirection service. The "100" adjacent to block 128 ("Percent Test Call") indicates that the redirection service is "ON", i.e., redirection services are to be applied to the communication. The application of such redirection services is specified by the following described blocks in the decision graph.

As illustrated in FIG. 4, the test call capability for communications also is shown as being either "ON" or "OFF". In this example, the subscriber has designated that "0%" of the communications omit test call capability by the "0" that appears before block 130 "GOTO (TEST CALL OFF). If some percentage had been designated, then the communications that constituted that percentage would be accorded redirection services as specified in blocks 144, 146, 148, 150, 152, 154 and 156 and described below. The "100" that appears before block 132 "ANN COLL (TEST CALL ON)" indicates that all communications directed to the directory number in this example are to receive test call capability. Preferably, the present invention provides the subscriber with the option of allotting test call capability to a percentage of communications so that test capability is not just "ON" or "OFF". Thus, if a subscriber allots test call capability to less than 100% of the communications directed to the directory number, then a caller may have to place several calls before test call capability is successfully invoked. This feature may serve to provide an additional safeguard against the unauthorized invocation of test call capability. The distribution of test call capability to communications based on the percentage selected by the subscriber is accomplished in a manner well known to those skilled in the art through the resources of the Advanced Intelligent Network.

As explained above, the preferred embodiment provides the source of the communication with an opportunity to invoke test call capability by the input of a valid PIN number. If the subscriber enters a PIN number, then in block 134 "COMPARISON", a comparison is made to determine whether the PIN is valid. If the PIN is invalid, then pursuant to block 136 "GOTO", the communication is provided with redirection services as specified in blocks 144, 146, 148, 150, 152, 154 and 156 and described below. If the PIN is valid, then pursuant to block 138 "CONNECTION PRIMARY NO.", the communication is routed to the directory number. If the PIN is invalid, then pursuant to block 140 "COME INTO 1" and block 142 "PERCENT TREATMENT", the communication is provided with redirection services. The particular type of redirection service provided to the communication depends on the selections made by the subscriber with respect to backup numbers, announcements, etc. In the preferred CRISISLINK service, the subscriber may select up to three different backup numbers for redirection of the communication. See blocks 144, 146 and 148. In addition, the subscriber may select the option of redirecting the communication to a custom announcement. See block 150. Further, the subscriber may select the option of routing the communication to the directory number. See block 154. Finally, the subscriber may select the option of redirecting the communication to a network announcement. See block 156. Of course, the communication will be redirected based on only one of the options, but the probability of which of the options the communication receives as a redirection service depends on the percentages the subscriber ascribes to each option. As illustrated in FIG. 4, the subscriber has chosen to use only two options in the redirection services: connection to backup #1 (block 144) or connection to backup #2 (block 146). Also, the subscriber has chosen to split the redirection of communications directed to the directory number evenly between backup #1 and backup #2. Thus, there is a 50/50 shot that a communication directed to the directory number will be ultimately be handled at backup #1 or backup #2.

Advantageously, the present invention provides the capability of checking the status of communication services with respect to a directory number or numbers to which redirection services have been applied. In particular, the present invention provides the capability of checking the status of communication services with respect to a particular directory number without disrupting the redirection services to that number or to other directory numbers. In addition, the present invention provides the described capability in a manner that is relatively inexpensive, that does not require on-premises equipment, that is easy to use, and that is easy to maintain and service.

While this invention has been described in detail with particular reference to the preferred embodiments thereof, it will be understood that variations and modifications can be effected within the spirit and scope of the invention as described hereinabove and as defined in the appended claims.

We claim:

1. In an intelligent switched telephone network including a switch and a service control point, said service control point being functionally connected to said switch and said service control point including a database of subscriber information, said network including a redirection service operative with respect to communications directed to a directory number to direct said communications away form said directory number to at least one other directory number, a method for routing a communication directed to said directory number having said redirection service to said directory number, thereby bypassing said redirection service, comprising the steps of:

receiving at said switch said communication directed to said directory number having said redirection service;

causing said switch to read identification information associated with said communication and to provide said identification information to said service control point;

causing said service control point
to read said identification information for the presence of said directory number,
to search for a matching entry to said directory number in said database of subscriber information,
in response to finding said matching entry, to read said matching entry for a bypass feature, said bypass feature indicating the availability of an option of bypassing the redirection service and having said communication routed to said directory number, and
in response to finding said bypass feature, to provide said switch with password collection instructions;

causing said switch, in response to said password collection instructions, to provide an opportunity for the entry of a password, said entry of said password indicating a desire to bypass said redirection service for said communication;

causing said switch, in response to said entry of said password, to provide said password to said service control point;

causing said service control point, in response to receipt of said password, to check the validity of said password in said database of subscriber information;

causing said service control point, in response to finding said password to be valid, to provide said switch with routing instructions to route said communication to said directory number, said routing instructions effectively bypassing said redirection service; and causing said switch to respond to said routing instructions by routing said communication to said directory number.

2. The method of claim 1, prior to said step of causing said switch to provide said opportunity for said entry of said password, further comprising the step of causing said switch to provide an announcement.

3. The method of claim 2, wherein said announcement is unobstrusive such that said announcement fails to directly inform said source of the option of bypassing said redirection service.

4. The method of claim 1, wherein said opportunity for said entry of said password comprises a predetermined time interval, and wherein said step of causing said switch to provide said opportunity for said entry of said password comprises causing said switch to provide a predetermined time interval for said entry of said password.

5. The method of claim 1, further comprising the step
in response to failing to find said bypass feature, causing said service control point to provide said switch with routing instructions to route said communication pursuant to said redirection service.

6. The method of claim 1, further comprising the step of:
in response to finding an invalid password, causing said service control point to provide said switch with routing instructions to route said communication pursuant to said redirection service.

7. In an intelligent switched telephone network wherein a redirection service is operative with respect to communications directed to a directory number to direct said communications away from said directory number to at least one other directory number, a method for routine a communication directed to said directory number by bypassing said redirection service and routing said communication to said directory number, comprising the steps of:

receiving said communication in said intelligent switched telephone network, said communication being received from a source and being directed to said directory number having said redirection service;

reading identification information associated with said communication for the presence of said directory number;

searching for a matching entry to said directory number in a database of subscriber information maintained by said network;

in response to finding said matching entry, reading said matching entry for a bypass feature, said bypass feature indicating that said source is to be given an option of bypassing said redirection service and having said communication routed to said directory number;

in response to finding said bypass feature, providing said source an opportunity for the entry of a password, said entry of said password indicating a desire by said source to take advantage of said bypass option;

in response to said entry of said password, checking said password for validity in said database of subscriber information; and in response to finding said password to be valid, routing said communication to said directory number so that said communication effectively bypasses said redirection service.

8. The method of claim 7, prior to said step of providing said source said opportunity for said entry of said password, further comprising the step of providing said subscriber with an announcement.

9. The method of claim 8, wherein said announcement is unobstrusive such that said announcement fails to directly inform said source of the option of bypassing said redirection service.

10. The method of claim 8, wherein said opportunity for said entry of said password comprises a predetermined time interval, and wherein said step of providing said source an opportunity for said entry of said password comprises providing said source with said predetermined time interval for said entry of said password.

11. The method of claim 7, further comprising the step of:
in response to failing to find said bypass feature, routing said communication pursuant to said redirection service.

12. The method of claim 7, further comprising the step of:
in response to finding an invalid password, routing said communication pursuant to said redirection service.

13. In an intelligent switched telephone network wherein a redirection service is operative with respect to communications directed to a directory number to direct said communications away from said directory number to at least one other directory number, a system for routing a communication directed to said directory number bypassing said redirection service and routing said communication to said directory number, comprising:

a switch operative to receive said communication in said intelligent switched telephone network, said communication being directed to said directory number having said directory service;

said switch being operative to read identification information associated with said communication and being responsive to said identification information to provide said identification information to a service control point;

said service control point being functionally connected to said switch, said service control point having a database of subscriber information maintained by said network;

said service control point being responsive to said identification information
- to read said identification information for the presence of said directory number,
- to search for a matching entry to said directory number in said database of subscriber information,
- in response to finding said matching entry, to read said matching entry for a bypass feature, said bypass feature indicating the availability of an option of bypassing the redirection service and having said communication routed to said directory number, and
- in response to finding said bypass feature, to provide said switch with password collection instructions;

said switch being responsive to said password collection instructions to provide an opportunity for the entry of a password in association with said communication, said entry of said password indicating a desire to bypass said redirection service for said communication;

said switch being responsive to said entry of said password to provide said password to said service control point;

said service control point being responsive to said password to check the validity of said password in said database of subscriber information;

said service control point being responsive to a valid password to provide said switch with routing instructions to route said communication to said directory number; and said switch being responsive to said routing instructions to route said communication to said directory number.

14. The system of claim 13, wherein said switch is responsive to said password collection instructions to provide said opportunity for said entry of said password by first providing an announcement.

15. The system of claim 14, wherein said announcement is unobstrusive such that said announcement fails to directly inform said source of the option of bypassing said redirection service.

16. The system of claim 13, wherein said opportunity for said entry of said password comprises a predetermined time interval.

17. The system of claim 13, further comprising:

in response to failing to find said bypass feature, said service control point being operative to provide said switch with redirection routing instructions to route said communication pursuant to said redirection service; and in response to receiving said redirection routing instructions, said switch being responsive to said redirection routing instructions to route said communication pursuant to said redirection service.

18. The system of claim 13, further comprising:

in response to finding an invalid password, said service control point being responsive to provide said switch with redirection routing instructions to route said communication pursuant to said redirection service; and in response to receiving said redirection routing instructions, said switch being responsive to said redirection routing instructions to route said communication pursuant to said redirection service.

\* \* \* \* \*